United States Patent
Narita et al.

(10) Patent No.: US 6,374,793 B1
(45) Date of Patent: Apr. 23, 2002

(54) CYLINDER HEAD STRUCTURE OF INTERNAL COMBUSTION ENGINE

(75) Inventors: Satoru Narita; Sumiko Fukuzawa, both of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/655,058

(22) Filed: Sep. 5, 2000

(30) Foreign Application Priority Data

Sep. 5, 1999 (JP) .......................................... 11-291420

(51) Int. Cl.$^7$ ................................................... F02F 1/42
(52) U.S. Cl. ................................................... 123/193.5
(58) Field of Search ............................... 123/193.5, 306

(56) References Cited

U.S. PATENT DOCUMENTS

| | | | | |
|---|---|---|---|---|
| 3,868,940 A | * | 3/1975 | Kirchweger | 123/306 |
| 4,069,667 A | * | 1/1978 | Date et al. | 123/193.5 |
| 4,159,011 A | * | 6/1979 | Sperry | 123/193.5 |
| 4,201,175 A | * | 5/1980 | Tanaka et al. | 123/193.5 |
| 4,302,935 A | * | 12/1981 | Cousimano | 123/193.5 |
| 4,537,028 A | * | 8/1985 | Humke | 123/193.5 |
| 4,706,622 A | * | 11/1987 | Cloke et al. | 123/306 |
| 5,009,204 A | * | 4/1991 | Ishii | 123/193.5 |
| 5,558,061 A | * | 9/1996 | Suminski | 123/306 |
| 5,816,210 A | * | 10/1998 | Yamaguchi | 123/193.5 |
| 6,173,695 B1 | * | 1/2001 | Davis et al. | 123/306 |

FOREIGN PATENT DOCUMENTS

JP  B22628138  4/1997

\* cited by examiner

*Primary Examiner*—Marguerite McMahon

(57) ABSTRACT

An intake port and an exhaust port are formed without changing a passage sectional area or its shape a little and without increasing an entire height of an engine. A seat machining part of a valve guide fixing seat of the intake port and the exhaust port are arranged at the cylinder head and are bent in any one of the right side direction or the left side direction as seen from the center of the valve. With such an arrangement, a minimum thickness for the seat machining can be assured, the intake port and the exhaust port do not change the passage sectional area or the sectional shape a little and so it is not necessary to increase the entire height of the engine.

15 Claims, 4 Drawing Sheets

CYLINDER HEAD STRUCTURE OF INTERNAL COMBUSTION ENGINE

BACKGROUND OF THE INVENTION

1. Field of the Invention

This invention relates to a port structure of a cylinder head, and more particularly a port structure in which a variation of a passage sectional area and a sectional shape of the port is reduced without increasing the size of the cylinder head.

2. Description of Background Art

An intake port shape of a cylinder head is normally set by assuring a back thickness of a valve guide fixing seat for its processing work and then connecting an opening part of the cylinder head with a line capable of assuring a minimum back thickness of the valve guide fixing seat. In this case, it is normally found that the center of the intake port approximately coincides with the center of the valve as seen from a valve stem side. Due to this fact, the back thickness for a machining of the valve guide fixing seat must be assured over an entire region of the port in its width direction. As a result, the upper side shape of the port is defined in reference to a machining position of the valve fixing seat (one example of the cylinder head with an intake port and an exhaust port formed therein is disclosed in Japanese Patent No. 2,628, 138).

In general, a passage sectional area of the port is a location where the lower side of a seat machining part of the aforesaid valve guide fixing seat shows the minimum sectional area and in order to assure the necessary passage sectional area at this location, the size of the port in its width direction is adapted to be wide. However, the adaptation for a size only in the width direction requires that the size of the cylinder head must be increased, resulting in certain limitations. In addition, even if the size of the cylinder head is increased, an excessive flat port may not improve the intake and charging efficiency. On the other hand, when a sufficient amount of vertical height of each of the ports is assured while an intake and charging efficiency is being preferentially applied, the machining position for the valve guide fixing seat is necessarily required to be raised, resulting in that a total height of the engine is increased and the valves themselves are elongated and their weight also is increased. In particular, in the case of a certain type of engine in which its entire height is required to be shortened such as an engine that is vertically installed or mounted wherein the crank shaft is directed in a forward or rearward direction of the chassis, it may easily be restricted by the shape of each of the ports. In view of this fact, it is an object of the present invention to solve the problems described above.

SUMMARY AND OBJECTS OF THE INVENTION

In order to solve the problems described above, the cylinder head structure of an internal combustion engine of the present invention is constructed such that the cylinder head is provided wherein each intake valve and exhaust valve and each intake port and exhaust port and a valve seat machining part for use in fixing a valve guide of said valve is formed near said ports. The present invention includes at least one of the intake port or the exhaust port that is bent to any of right or left sides near said seat machining part and the center of each of the ports is offset from a back thickness part of the seat machining part.

Since the center of each of the ports is offset from the center of the valve stem as seen from the valve stem, the upper side position of each of the ports can be set to be higher than the seat machining part while assuring the minimum back thickness of the seat machining part, so that it is not necessary to adapt it only with the width of the port for assuring the passage sectional area at the port with the result that the passage sectional area can be sufficiently assured and the shape has a less amount in variation of the sectional area. Accordingly, it becomes possible to maintain an increased weight of the engine or a superior operation of each of the valves and at the same time if it is applied to the intake port, it is possible to improve an intake and filling efficiency.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
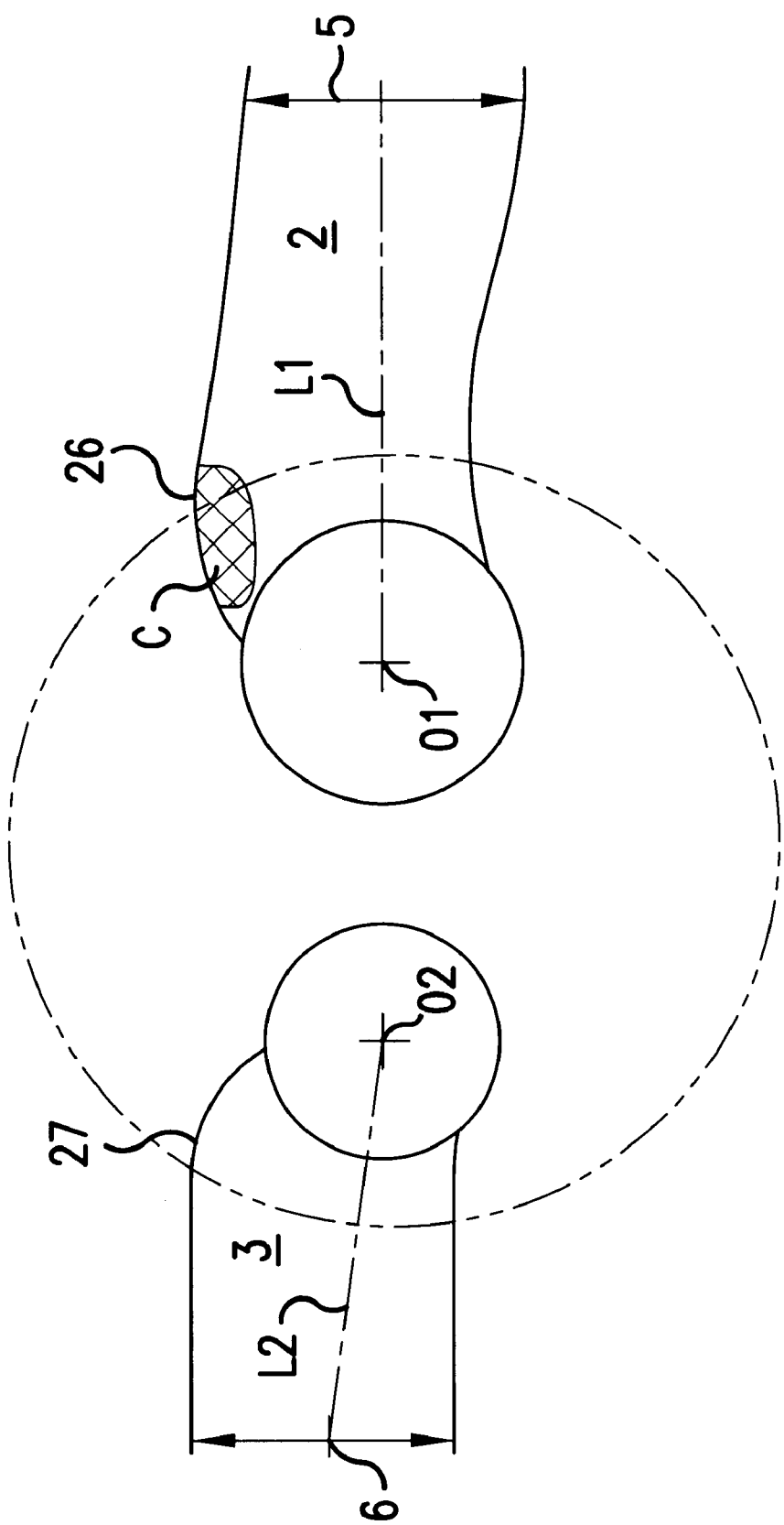
FIG. 1 a schematic illustrative view of an intake port and an exhaust port in accordance with the preferred embodiment.

Referring now to the drawings, one preferred embodiment of the present invention will be described as follows. FIGS. 1–4 illustrate a 4-cycle air-cooled vertical mounted type engine, wherein the cylinder head 1 is formed with an intake port 2 and an exhaust port 3 which are oppositely faced to each other, each of the ports is bent to communicate with a combustion chamber 4, an intake port inlet 5 and an exhaust port outlet 6, a carburetor is connected to the intake port inlet 5 and an exhaust pipe is connected to the exhaust port outlet 6 (they are not shown).

An opening of each of the ports adjacent to the combustion chamber 4 is opened or closed by the intake valve 7 and the exhaust valve 8. Stems 9, 10 of the intake valve 7 and the exhaust valve 8 pass across the corresponding intake and exhaust ports and extend upwardly, the stems are driven by a rocker arm 12 arranged within a cylinder head cover 11 and biased by valve springs 13, 14 toward their closing direction. One end of each of the valve springs 13, 14 is received by valve guides 15, 16, respectively and the other end of each of the valve springs is received by a retainer 17 fixed to each of the end parts of the stems 9, 10, respectively.

Each of valve receivers parts 15a, 16a of the valve guides 15, 16 is supported on seat surfaces 20, 21 formed at the bottom parts in valve spring holes 18, 19 machined from above the cylinder head 1. Each of the seat surfaces 20, 21 formed at the bottom part of each of these valve spring holes 18, 19 is mechanically worked to fix a valve guide and each of them corresponds to the seat surface machining part of the present invention.

Each of the parts of the intake port 2 and the exhaust port 3 below these seat surfaces 20, 21 is formed with relief parts 22, 23 that are varied in a step-like manner. Each of the thick parts formed by these relief parts between the seat surface 20 and the intake port 2, and between the seat surface 21 and the exhaust port 3 is applied as back thickness parts 24, 25 so as to assure a minimum thickness, respectively.

Figure 2:
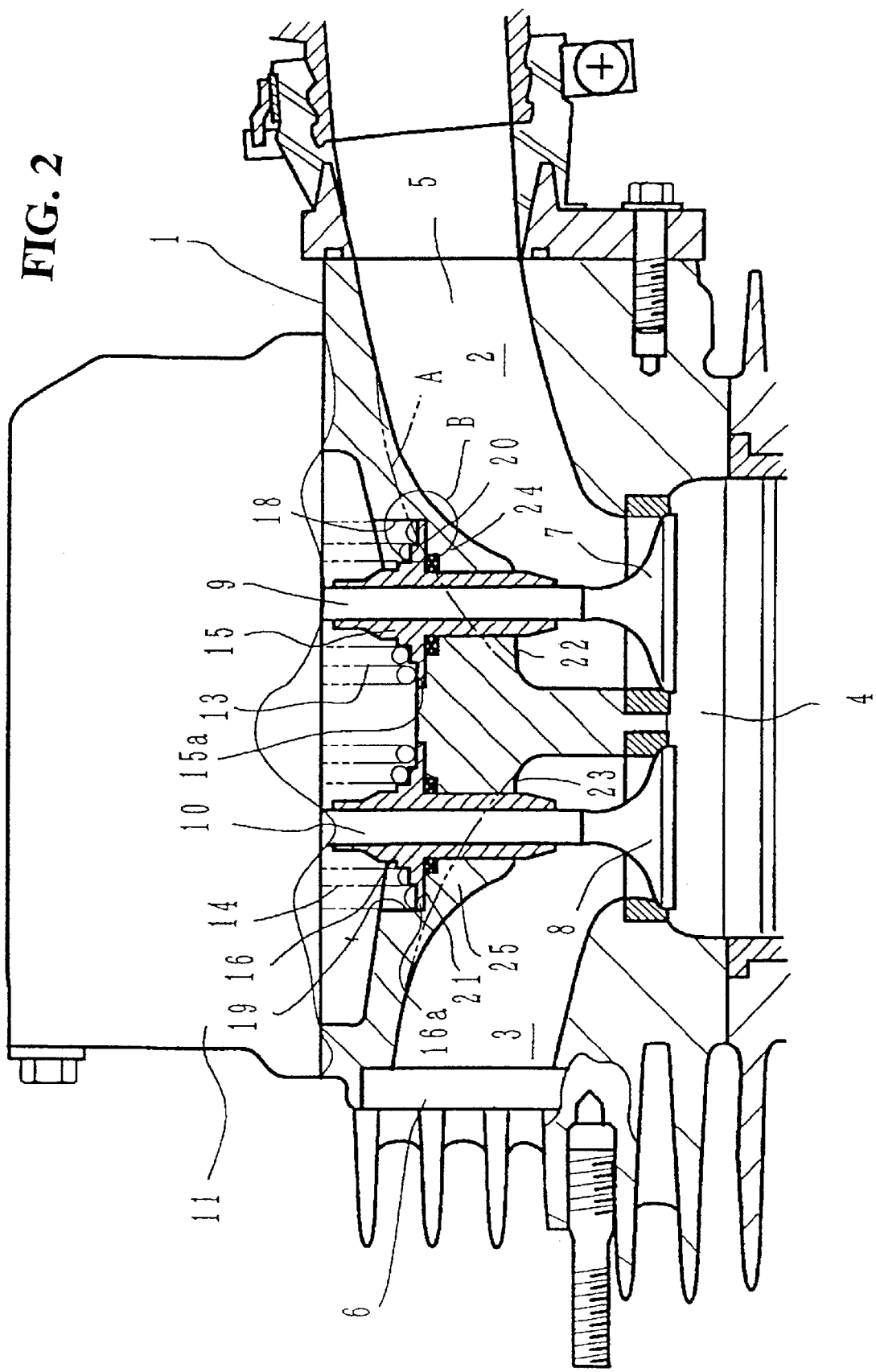
FIG. 2 a sectional view for showing a cylinder head.

In particular, as shown in FIG. 2, the relief part 22 is not formed at the intake port 2, and when the intake port 2 is indicated by an imaginary line A in the case that the intake port 2 is connected by a smooth curved line, this imaginary line A is overlapped with the part of the seat surface 20 (refer to the portion enclosed by a circle B). This overlapped part B is a location where a part of the inner wall of the intake port 2 is present above the seat surface 20.

That is, as shown in FIG. 1, each of the intake port 2 and the exhaust port 3 shows a substantial curve in any of the right and left directions at curved parts 26, 27 near the valves with respect to lines L1, L2 when each of a center O1 of the intake valve 9 and a center O2 of the exhaust valve 10 is connected by the lines L1, L2.

In these parts, the curved parts 26, 27 curved outward from the lines L1, L2 are parts corresponding to the relief parts 22, 23. That is, if a sectional surface crossing at a right angle to the curved parts 26, 27 taken along lines L1, L2 is defined, the upper side of each of the ports at this sectional surface becomes each of the relief parts 22, 23 lowered in a step-like manner.

The center of each of the ports is offset to any one of the right and left sides in an outward curved state to form the relief parts 22, 23 and then the aforesaid back thickness parts 24, 25 are assured above the relief parts. In addition, at the intake port 2, the center of the port is displaced from below the seat surface 20 in a lateral direction, so that its upper part can be set at a higher position than that of the seat surface 20. The part C indicated by a hatched section in FIG. 1 corresponds to this portion. Such a setting as the one described above can be adjusted with reference to a degree of offset.

Figure 3:
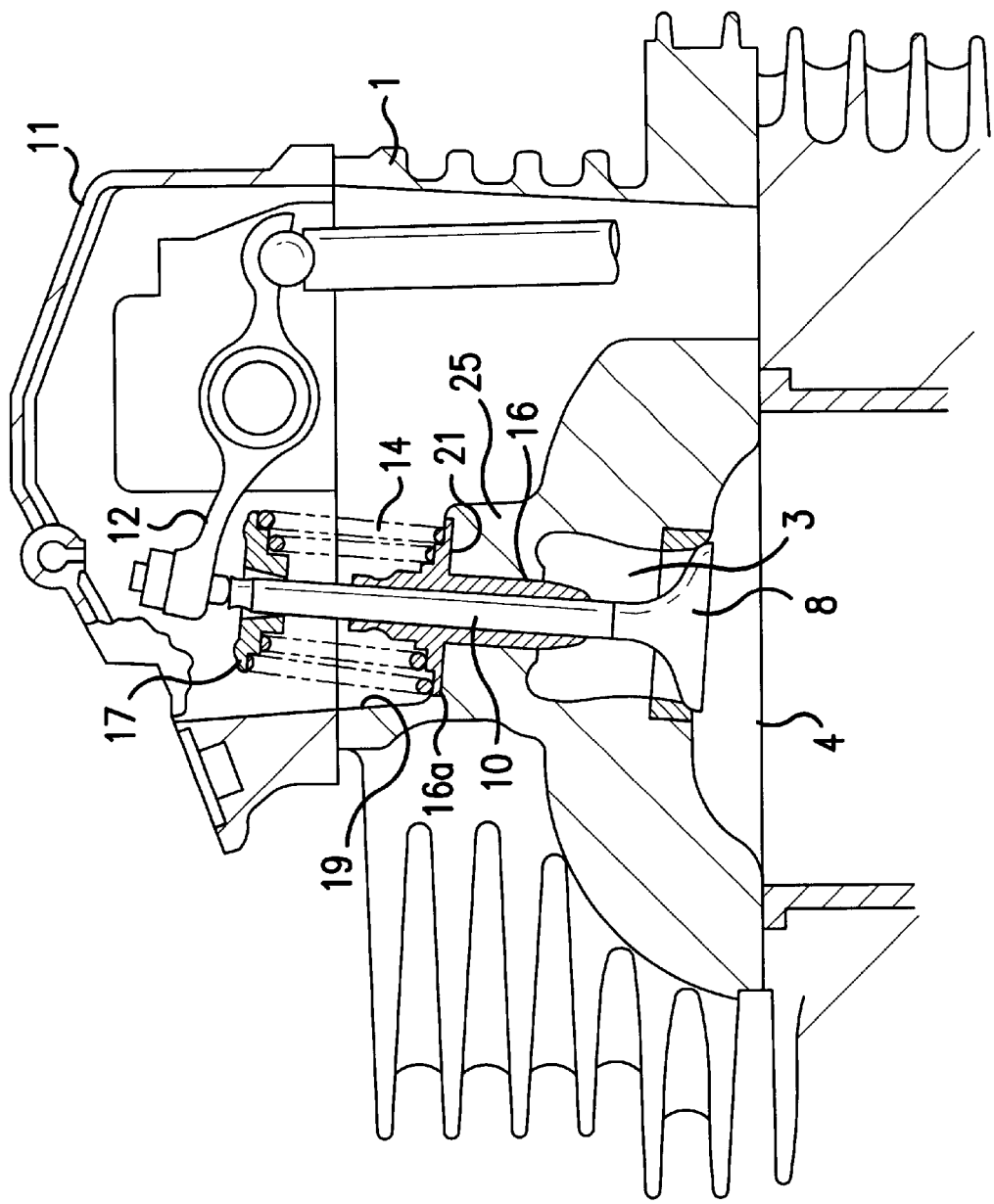
FIG. 3 a sectional view for showing the center of the exhaust valve.
Figure 4:
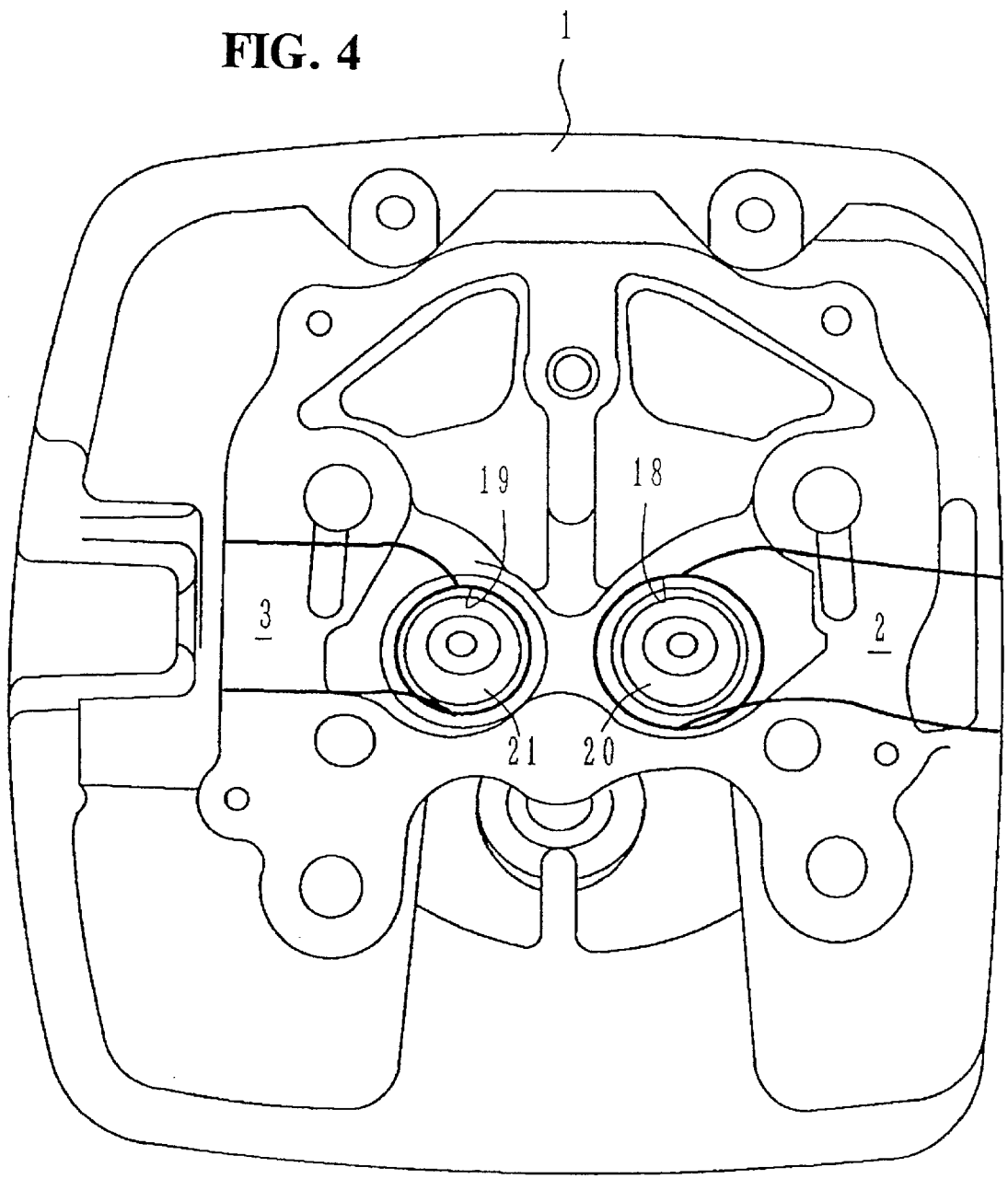
FIG. 4 a top plan view for showing a cylinder head on which an arrangement of the intake port and the exhaust port is overlapped.

In addition, the exhaust port 3 shown in FIG. 3 is symmetrical about the center of the stem 10 at the exhaust valve 8, but is not offset. The sectional area of the center of the exhaust valve 8 coincides with the center of the exhaust port 3 and advances toward the outlet 6 to produce an offset state. Although not shown in the figure, the intake port 2 also may have a similar arrangement.

As described above, since the intake port 2 and the exhaust port 3 are bent towards the right or towards the left as seen from the center of each of the stems 9 and 10 of the intake valve 7 and the exhaust valve 8 and the centers of the intake port 2 and the exhaust port 3 are displaced from each of the lower portions of the seat surfaces 20, 21, a sufficient thickness can be assured in the back thickness parts 24 and 25. Further, it is not required that each of the sectional areas of the intake port 2 and the exhaust port 3 is changed and each of the sectional shapes is made substantially flat.

Due to this fact, it is not necessary that a passage sectional area of each of the intake port 2 and the exhaust port 3 is reduced. The height of the cylinder head 1 is set high to assure a minimum thickness of each of the back thickness parts 24 and 25, resulting in that it is not necessary that the size of the intake valve 7 or the exhaust valve 8 is set to be large. In particular, since the part of the inner wall of the port is set to be higher than that of the seat surface 20 at the intake port 2, the central part of the port can be set to be approximate to a rational curved line indicated by the imaginary line A indicated in FIG. 2, so that the intake and filling efficiency can be improved.

In addition, it is not necessary to adapt only with the width of the port in the case that the passage sectional area of the port is assured, resulting in that the passage sectional area can be sufficiently assured and a shape of less variation in sectional area can be attained. Accordingly, it becomes possible to increase the weight of the engine and keep a superior operation of the valve and as compared with the prior art structure having the same performance. Thus, a lightweight and small-sized unit can be attained. Additionally, since the present invention is applied to the vertical-installed engine, the shape of the port can be easily set to a rational one irrespective of a certain restriction in the entire height and then this port structure becomes effective for this kind of vehicle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A cylinder head structure for an internal combustion engine comprising:

a cylinder head including an intake valve and an exhaust valve;

an intake valve guide operatively connected to said intake valve;

an exhaust valve guide operatively connected to said exhaust valve;

an intake port;

an exhaust port;

a valve seat for use in fixing said valve guide of said intake valve, said valve seat being formed adjacent to said intake port;

said intake port is curved in a direction relative to said cylinder head wherein a center of the intake port is offset from a back thickness part of the valve seat and said valve seat overlaps with an inner wall of said intake port.

2. The cylinder head structure according to claim 1, wherein said intake port includes a intake relief part that extends in a step-like manner for assuring a minimum thickness of the valve seat.

3. The cylinder head structure according to claim 2, wherein said intake relief part includes a curved part near the intake valve as defined by a centerline of the intake valve relative to a centerline of the intake port.

4. The cylinder head structure according to claim 2, wherein said intake valve guide includes an intake seat surface positioned within an aperture in the intake relief part for mounting said intake valve guide relative to said valve seat.

5. A cylinder head structure for an internal combustion engine comprising:

a cylinder head including an intake port and an exhaust port;

an intake valve operatively mounted in said intake port;

an exhaust valve operatively mounted in said exhaust port; and a valve seat for use in fixing an intake valve guide of said intake valve and an exhaust valve guide of said exhaust valve, said valve seat being formed near said intake port and said exhaust port, said valve seat including an enlarged area;

said intake port being curved in a direction relative to said cylinder head wherein the center of said intake port is offset from said enlarged area of the valve seat and said valve seat overlaps with an inner wall of said intake port;

said exhaust port being curved in a direction relative to said cylinder head wherein the center of said exhaust port is offset from said enlarged area of the valve seat and said valve seat overlaps with an inner wall of said exhaust port.

6. The cylinder head structure according to claim 5, wherein said intake port includes a intake relief part that extends in a step-like manner for assuring a minimum thickness of the valve seat.

7. The cylinder head structure according to claim 5, wherein said exhaust port includes a exhaust relief part that extends in a step-like manner for assuring a minimum thickness of the valve seat.

8. The cylinder head structure according to claim 6, wherein said intake relief part includes a curved part near the intake valve as defined by a centerline of the intake valve relative to a centerline of the intake port.

9. The cylinder head structure according to claim 7, wherein said exhaust relief part includes a curved part near the exhaust valves as defined by a centerline of the exhaust valve relative to a centerline of the exhaust port.

10. The cylinder head structure according to claim 6, wherein said intake valve guide includes an intake seat surface positioned within an aperture in the intake relief part for mounting said intake valve guide relative to said valve seat.

11. The cylinder head structure according to claim 7, wherein said exhaust valve guide includes an exhaust seat surface positioned within an aperture in the exhaust relief part for mounting said exhaust valve guide relative to said valve seat.

12. A cylinder head structure for an internal combustion engine comprising:

a cylinder head including an intake valve and an exhaust valve;

an intake valve guide operatively connected to said intake valve;

an exhaust valve guide operatively connected to said exhaust valve;

an intake port;

an exhaust port;

a valve seat for use in fixing said valve guide of said exhaust valve, said valve seat being formed adjacent to said exhaust port;

said exhaust port is curved in a direction relative to said cylinder head wherein a center of the exhaust port is offset from a back thickness part of the valve seat and said valve seat overlaps with an inner wall of said exhaust port.

13. The cylinder head structure according to claim 12, wherein said exhaust port includes a exhaust relief part that extends in a step-like manner for assuring a minimum thickness of the valve seat.

14. The cylinder head structure according to claim 13, wherein said exhaust relief part includes a curved part near the exhaust valve as defined by a centerline of the exhaust valve relative to a centerline of the exhaust port.

15. The cylinder head structure according to claim 13, wherein said exhaust valve guide includes an exhaust seat surface positioned within an aperture in the exhaust relief part for mounting said exhaust valve guide relative to said valve seat.

* * * * *